(12) United States Patent
Guo et al.

(10) Patent No.: US 6,710,005 B1
(45) Date of Patent: Mar. 23, 2004

(54) ALUMINOXANE MODIFICATION

(75) Inventors: Shao-Hua Guo, Exton, PA (US); Shaotian Wang, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/410,850

(22) Filed: Apr. 10, 2003

(51) Int. Cl.⁷ .................................................. B01J 31/14
(52) U.S. Cl. .................. 502/132; 502/103; 502/152; 526/160; 526/943; 526/348; 526/125.1; 556/28
(58) Field of Search ................. 526/160, 943, 526/348, 125.1; 502/132, 103, 152; 556/28

(56) References Cited

U.S. PATENT DOCUMENTS

| | | | |
|---|---|---|---|
| 4,404,344 A | 9/1983 | Sinn et al. ................... | 526/160 |
| 4,769,510 A | 9/1988 | Kaminsky et al. ........... | 585/512 |
| 4,990,640 A * | 2/1991 | Tsutsui et al. ............... | 556/181 |
| 5,041,585 A | 8/1991 | Deavenport et al. ......... | 556/179 |
| 5,539,124 A | 7/1996 | Etherton et al. ............. | 548/402 |
| 5,543,377 A | 8/1996 | Tsutsui et al. ............... | 502/125 |
| 5,637,660 A | 6/1997 | Nagy et al. .................. | 526/160 |
| 5,756,611 A | 5/1998 | Etherton et al. ............. | 526/127 |
| 5,859,157 A | 1/1999 | Gupte et al. ................. | 526/88 |
| 5,955,625 A | 9/1999 | Canich .......................... | 556/7 |
| 6,034,027 A | 3/2000 | Krishnamurti et al. ....... | 502/200 |
| 6,127,484 A | 10/2000 | Cribbs et al. ................ | 525/191 |
| 6,160,066 A | 12/2000 | Canich ......................... | 526/160 |
| 6,211,311 B1 | 4/2001 | Wang et al. .................. | 526/131 |
| 6,340,771 B1 | 1/2002 | Hoang et al. ................ | 556/171 |
| 6,350,831 B1 | 2/2002 | Takemori et al. ............ | 526/160 |

FOREIGN PATENT DOCUMENTS

| | | |
|---|---|---|
| EP | 0 561 476 A1 * | 9/1993 |
| WO | WO 98/20045 * | 5/1998 |
| WO | WO99/50203 * | 10/1999 |

* cited by examiner

*Primary Examiner*—Ling-Siu Choi
(74) *Attorney, Agent, or Firm*—Shao-Hua Guo

(57) ABSTRACT

A modified aluminoxane is disclosed. Aluminoxane compounds are modified with glycol ethers or polyethers. The modified aluminoxanes are effective activators for single-site catalysts. Catalyst activated with the modified aluminoxane produces polyolefin with increased melt flow index, broadened molecular weight distribution, and improved thermal processability.

4 Claims, No Drawings

ALUMINOXANE MODIFICATION

FIELD OF THE INVENTION

The invention relates to modification of aluminoxane. More particularly, the invention relates to modification of aluminoxane with glycol ether or polyether.

BACKGROUND OF THE INVENTION

Single-site catalysts are known. They can be divided into metallocenes and non-metallocenes. Metallocene single-site catalysts are transition metal compounds that contain cyclopentadienyl (Cp) or Cp derivative ligands. Non-metallocene single-site catalysts contain ligands other than Cp but have similar catalytic characteristics to the metallocenes. The non-metallocene single-site catalysts often contain heteroatomic ligands, e.g., boraary, pyrrolyl, azaborolinyl, indenoindolyl and quinolinyl.

Aluminoxane compounds are activators for single-site catalysts. There are many ways to make aluminoxane compounds. For instance, aluminoxanes can be produced by contacting a trialkylaluminum compound with water. See U.S. Pat. No. 5,041,585. Commonly used aluminoxane is methyl aluminoxane (MAO) or its derivatives.

Methods for modifying aluminoxanes are known. For instance, U.S. Pat. No. 6,340,771 teaches modifying MAO with sugar to make "sweet" MAO. Also, U.S. Pat. No. 5,543,377 teaches modifying aluminoxane compounds with ketoalcohols and β-diketones.

Single-site catalysts produce polyolefin having narrow molecular weight distribution. The uniformity of molecular weight distribution of single-site polyolefin, although improving tensile strength and other physical properties of polymer products, makes the thermal processing difficult. Many methods have been developed to improve processability of single-site polyolefin. U.S. Pat. No. 6,127,484, for example, teaches a multiple-zone, multiple-catalyst process for making polyethylene. The polymer produced has a broad molecular weight distribution and improved processability.

New methods for modifying aluminoxane compounds are needed. Ideally, the method would be inexpensive and easy to practice. Particularly, the modified aluminoxane would increase molecular weight distribution and improve the processability of single-site polyolefin.

SUMMARY OF THE INVENTION

The invention is a modified aluminoxane. The modified aluminoxane is prepared by treating an aluminoxane compound with glycol ether or polyether. The invention also provides a catalyst system for olefin polymerization. The catalyst system comprises the modified aluminoxane and a transition metal complex. The catalyst system produces polyolefin that has increased melt flow index, broadened molecular weight distribution, and improved thermal processability.

DETAILED DESCRIPTION OF THE INVENTION

The invention is a modified aluminoxane. The modified aluminoxane is prepared by treating an aluminoxane compound with glycol ether or polyether. By "treating," we meant either chemically reacting or physically mixing, or both.

Suitable aluminoxane compounds include linear aluminoxanes having the formula:

$$R^1{}_2AlO(R^2AlO)_nAlR^3{}_2$$

$R^1$, $R^2$, and $R^3$ are independently selected from the group consisting of $C_{1-20}$ hydrocarbyl radicals and n is from 0 to 50. Preferably, $R^1$, $R^2$, and $R^3$ are methyl group. Preferably, n is from 0 to 10.

Suitable aluminoxane compound also includes cyclic aluminoxanes having a repeating unit of $$-[Al(R^4)-O]-$$

$R^4$ is a $C_{1-20}$ hydrocarbyl. Preferably, $R^4$ is methyl group.

Suitable glycol ethers include monoalkyl and dialkyl ethers of ethylene glycol, propylene glycol, diethylene glycol, dipropylene glycol, 1,4-butanediol, 1,3-butanediol, 1,5-pentanediol, 1,6-hexanediol, 2,2-dimethyl-1,3-propanediol, cyclohexane-1,4-dimethanol, neopentyl glycol, and mixtures thereof. Examples of suitable glycol ethers are ethylene glycol monomethyl ether, ethylene glycol dimethyl ether, ethylene glycol monoethyl ether, ethylene glycol diethyl ether, ethylene glycol monopropyl ether, ethylene glycol dipropyl ether, ethylene glycol monobutyl ether, ethylene glycol dibutyl ether, propylene glycol monomethyl ether, propylene glycol dimethyl ether, propylene glycol monoethyl ether, propylene glycol diethyl ether, propylene glycol monopropyl ether, propylene glycol dipropyl ether, propylene glycol monobutyl ether, propylene glycol dibutyl ether, the like, and mixtures thereof. Preferably, the glycol ethers are monoalkyl ethers.

Suitable polyethers include polyethylene glycol, polyethylene glycol monoalkyl ethers, polyethylene glycol dialkyl ethers, polypropylene glycol, polypropylene glycol monoalkyl ethers, polypropylene glycol dialkyl ethers, the like, and mixtures thereof. Polyethers also include glycol ethers which have more than two glycol units, such as triethylene glycol, tripropylene glycol, and their mono- and dialkyl ethers.

The treatment can be carried out at a temperature from 0° C. to 200° C. Preferably, the temperature is from 20° C. to 40° C. The weight ratio of glycol ether or polyether to aluminoxane may be from 1:500 to 5:1, preferably from 1:100 to 1:1. Generally, the treatment takes place in an inert diluent or solvent, preferably under an inert atmosphere such as nitrogen. Suitable diluents and solvents include aliphatic and aromatic hydrocarbons, ethers, esters, and ketones. After the treatment, diluents and solvents may be removed.

Glycol ether- or polyether-treated aluminoxane compounds are activators for single-site catalysts. Single-site catalysts suitable for use in the present invention include transition metal complex having the general formula:

$$(L)_n-M-(X)_m$$

M is a transition metal. Preferably, M is Zr, Ti, or Hf. More preferably, M is Zr.

X is an activatable ligand. "Activatable ligand" means a ligand which is able to be activated by the treated aluminoxane to facilitate olefin polymerization. X is independently selected from the group consisting of hydrogen, halides, $C_{1-10}$ hydrocarbyls, $C_{1-10}$ alkoxys, and $C_{5-10}$ aryloxys. The hydrocarbyl, alkoxy, and aryloxy ligands may also be substituted, for example, by halogen, alkyl, alkoxy, and aryloxy groups. Preferably, X is a halide. More preferably, X is chloride.

L is a ligand preferably selected from the group consisting of cyclopentadienyl, boraary, pyrrolyl, azaborolinyl, quinolinyl, indenoindolyl, and phosphinimine, the like, and mixtures thereof. These ligands provide the catalysts with "single-site" nature. That is, the catalyst has only one active site for olefin polymerization and thus provides the polyolefin with relatively narrow molecular weight and composition distributions.

Cyclopentadienyl ligands include substituted cyclopentadienyl such as methyl, isopropyl, and butyl cyclopentadienyl ligands. Cyclopentadienyl ligands also include substituted and non-substituted indenyl and fluorenyl ligands. Cyclopentadienyl based single-site catalysts are known, see, e.g., U.S. Pat. Nos. 4,404,344, 4,769,510, 6,160,066, and 5,955,625, the teachings of which are incorporated herein by reference.

Boraary, pyrrolyl, azaborolinyl, quinolinyl, and phosphinimine based single-site catalysts are also known, see, e.g., U.S. Pat. Nos. 6,034,027, 5,539,124, 5,756,611, 5,637,660, 6,340,771, and 6,350,831, the teachings of which are incorporated herein by reference. These heteroatom-containing can also be substituted.

Numbers n and m depend on the valence of the transition metal. The sum of n and m equals to the valence of the metal. Number n is preferably 1 or greater.

Two L ligands can be bridged. Groups that can be used to bridge the ligands include, for example, methylene, ethylene, 1,2-phenylene, and dialkyl silyls. Examples are $-CH_2-$, $-CH_2-CH_2-$, and $-Si(CH_3)_2-$. Bridging changes the geometry around the transition metal and can improve catalyst activity and other properties such as comonomer incorporation.

The catalyst may be immobilized on a support. The support is preferably a porous material such as inorganic oxides and chlorides, organic polymer resins, and mixtures thereof. Preferred inorganic oxides include oxides of Group 2, 3, 4, 5, 13, or 14 elements. Preferred supports include silica, alumina, silica-aluminas, magnesias, titanias, zirconias, magnesium chloride, clay, and crosslinked polystyrene. Silica is most preferred.

Preferably, the support has a surface area in the range of about 10 to about 700 $m^2/g$, a pore volume in the range of about 0.1 to about 4.0 mL/g, an average particle size in the range of about 5 to about 500 μm, and an average pore diameter in the range of about 5 to about 1000 Å. They are preferably modified by heat treatment, chemical modification, or both. For heat treatment, the support is preferably heated at a temperature from about 50° C. to about 1000° C. More preferably, the temperature is from about 50° C. to about 600° C.

Suitable chemical modifiers include organoaluminum, organosilicon, organomagnesium, and organoboron compounds. Organosilicon and organoboron compounds, such as hexamethyl-disilazane and triethylborane, are preferred. Suitable techniques to support a single-site catalyst are taught, for example, in U.S. Pat. No. 6,211,311, the teachings of which are incorporated herein by reference.

Polymerization is conducted in the presence of the treated aluminoxane and a single-site catalyst. It can be conducted in bulk, gas phase or slurry phase. Methods and apparatus for gas phase polymerization of ethylene with Ziegler catalysts are well known, and they are suitable for use in the process of the invention. For example, U.S. Pat. No. 5,859,157, the teachings of which are herein incorporated by reference, teaches in detail a gas phase polymerization of ethylene with a Ziegler catalyst. The slurry-phase polymerization is performed in an organic solvent that can disperse the catalyst and polyolefin. Suitable solvents include $C_4$ to $C_{10}$ linear, branched, and cyclic aliphatic, and $C_6-C_{12}$ aromatic hydrocarbons. Examples of suitable solvents are butane, hexane, cyclohexane, octane, heptane, isobutene, toluene, and mixtures thereof.

The polymerization is preferably conducted under pressure. The pressure is preferably in the range of about 50 to about 15,000 psi, more preferably from about 100 to about 5,000 psi, and most preferably from about 200 to about 2,000 psi. Generally, the higher the pressure, the more productive the process. Laboratory operations are conducted under relatively low pressure for safety reasons. Polymerization is preferably conducted at a temperature below 100° C. More preferably, the temperature is within the range of about 50° C. to about 90° C.

A scavenger is preferably used in the polymerization. Scavengers reduce the effect of a trace amount of moisture and oxygen existing in the reactor on the polymerization and increase the activity and lifetime of the catalysts. Suitable scavengers include alkyl aluminum compounds. Scavengers are added into the reactor prior to the addition of catalyst. The amount of scavengers is about 1 to 2000 times in mole of the catalyst.

Suitable olefins for the polymerization include $C_{2-10}$ α-olefins, cyclic olefins, dienes, and mixtures thereof. Examples are ethylene, propylene, 1-butene, 1-hexene, cyclopetene, and isoprene.

We have found that using the treated aluminoxane of the invention with a single-site catalyst can effectively increase melt flow index, broaden the molecular weight distribution of polyolefin, and therefore improves the thermal processability of the polymer. Further, using the treated aluminoxane of the invention introduces glycol ether or polyether component into olefin polymerization. These polar compounds can function as antistatic agents to reduce reactor fouling. Many other advantages of the invention are also expected.

The following examples merely illustrate the invention. Those skilled in the art will recognize many variations that are within the spirit of the invention and scope of the claims.

EXAMPLE 1

Polymerization of Ethylene With Propylene Glycol Methyl Ether (PGME)-Modified Methylaluminoxane (MAO)

Step I. Modification of MAO With PGME

In an inert atmosphere glovebox, MAO (4 mL of 30 weight percent MAO in toluene solution, product of Albemarle) is mixed with 37 mg of PGME (product of Aldrich). The mixture is stirred for 30 minutes, and the modified MAO is used for the next step.

Step II. Immobilization of Modified MAO on Support

Silica (Davison G955) is calcined at 250° C. for 12 hours and then cooled to room temperature. In an inert atmosphere glovebox, 5 grams of the calcined silica is mixed with the above modified MAO. After stirring the mixture for about 30 minutes, the toluene is removed by vacuum and the treated silica is then dried in vacuum (about 28.5 inches mercury) at room temperature for about 3 hours.

Step III. Preparation of Supported Catalyst

In an inert atmosphere glovebox, MAO (1.12 mL, 30 weight percent MAO in toluene solution, purchased from Albemarle) is diluted with toluene (2.3 mL). Dimethylsilyl-bridged indeno[2,1-b]indolyl cyclopentadienyl zirconium dichloride (53.0 mg) is added to the solution. The product of step II (1.27 g) is added to the solution. The mixture is stirred for an additional 30 minutes and then dried by vacuum (about 28.5 inches mercury) at room temperature for about 2 hours. About 1.70 g of each final supported catalyst is obtained.

Step IV. Polymerization

A one-liter, stainless-steel reactor is charged with 1-hexene (75 mL), and triisobutylaluminum (1.0 mL of 1.0

M solution in heptane, 1.0 mmol). Hydrogen is added (100 psig from a 10-mL stainless-steel cylinder pressurized initially to about 670 psig $H_2$) to the reactor, which is then pressurized with ethylene to 375 psig. The reactor contents heated at 75° C., and then the supported catalyst of step III (19 mg) is flashed into the reactor with about 50 mL of isobutane. The polymerization proceeds for 0.5 hour. The reactor is vented and the polymer is collected and dried by vacuum. The polymer has a weight-average molecular weight (Mw): 91,500, molecular weight distribution (Mw/Mn): 3.6, melt index (MI): 2.7, and density 0.914 g/mL.

EXAMPLE 2

Polymerization of Ethylene With Polypropylene Glycol (PPG)-Modified MAO

Step I. Modification of MAO With PPG

In an inert atmosphere glovebox, MAO (4 mL of 30 weight percent MAO in toluene solution) is mixed with 175 mg of PPG (average Mn of about 425, product of Aldrich). The mixture is stirred for 30 minutes. The modified MAO is used for the next step.

Step II. Immobilization of Modified MAO on Support

Silica (Davison G955) is calcined at 250° C. for 12 hours before cooling to room temperature. In an inert atmosphere glovebox, 5 grams of the calcined silica is mixed with the above modified MAO. After stirring for about 30 minutes, the toluene is removed by vacuum from the mixture and the treated silica is then dried in vacuum (about 28.5 inches mercury) at room temperature for about 3 hours.

Step III. Preparation of Supported Catalyst

In an inert atmosphere glovebox, MAO (1.12 mL, 30 weight percent MAO in toluene solution, purchased from Albemarle) is diluted with toluene (2.3 mL). Dimethylsilyl-bridged indeno[2,1-b]indolyl cyclopentadienyl zirconium dichloride (53.0 mg) is added to the solution. The product of step III (1.27 g) is added to the solution. The mixture is stirred for an additional 30 minutes and then dried by vacuum (about 28.5 inches mercury) at room temperature for about 2 hours. About 1.70 g of each final supported catalyst is obtained.

Step IV. Polymerization

The polymerization procedure of Example 1 is repeated, but the above supported catalyst containing PPG-modified, rather than PGME-modified, MAO is used. The polymer has Mw: 82,100, Mw/Mn: 3.3, MI: 4.05, and density: 0.912 g/mL.

COMPARATIVE EXAMPLE 3

Polymerization of Ethylene With Unmodified MAO

Polymerization procedure of Example 1 is repeated, but no modified MAO is used. The polymer has Mw: 96,000, Mw/Mn: 2.8, MI: 0.95, and density: 0.908 g/Ml.

Compared with unmodified MAO, the polymers made with either PGME-modified or PPG-modified MAO has significantly increased Mw/Mn and MI. The results are listed in Table 1.

TABLE 1

| Example | MAO modifier | Mw | Mw/Mn | MI | Density, g/mL |
|---|---|---|---|---|---|
| 1 | Propylene glycol methyl ether | 91,500 | 3.6 | 2.7 | 0.914 |
| 2 | Polypropylene glycol | 82,100 | 3.3 | 4.05 | 0.912 |
| C3 | None | 96,000 | 2.8 | 0.95 | 0.908 |

We claim:

1. A modified aluminoxane comprising an aluminoxane compound and a polyether having more than three of glycol units.

2. The modified aluminoxane of claim 1 wherein the polyether is selected from the group consisting of polyethylene glycol, polyethylene glycol monoalkyl ethers, polyethylene glycol dialkyl ethers, polypropylene glycol, polypropylene glycol monoalkyl ethers, and polypropyllene glycol dialkyl ethers.

3. The modified aluminoxane of claim 1 wherein the aluminoxane compound has the general formula:

$$R^1{}_2AlO(R^2AlO)_nAlR^3{}_2$$

wherein each $R^1$, $R^2$, and $R^3$ is independently a $C_{1-20}$ hydrocarbyl and n is from 0 to 50.

4. The modified aluminoxane of claim 1 wherein the aluminoxane compound is a cyclic aluminoxane having a repeating unit of

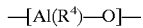

$$-[Al(R^4)-O]-$$

wherein $R^4$ is a $C_{1-20}$ hydrocarbyl.

* * * * *